United States Patent
Ince et al.

(10) Patent No.: US 10,578,175 B2
(45) Date of Patent: Mar. 3, 2020

(54) RADIAL WEDGE PLATE CLUTCH

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 225 days.

(21) Appl. No.: 15/724,792

(22) Filed: Oct. 4, 2017

(65) Prior Publication Data

US 2019/0101172 A1  Apr. 4, 2019

(51) Int. Cl.
*F16D 43/18* (2006.01)
*B60K 23/08* (2006.01)
*F16D 41/063* (2006.01)
*F16D 15/00* (2006.01)

(52) U.S. Cl.
CPC .............. *F16D 43/18* (2013.01); *B60K 23/08* (2013.01); *B60K 2023/0875* (2013.01); *F16D 15/00* (2013.01); *F16D 41/063* (2013.01)

(58) Field of Classification Search
CPC ............................................. B60K 2023/0875
See application file for complete search history.

(56) References Cited

U.S. PATENT DOCUMENTS

| | | | |
|---|---|---|---|
| 9,611,899 B2 | 4/2017 | Lee et al. | |
| 2015/0083539 A1 | 3/2015 | Lee et al. | |
| 2016/0091034 A1* | 3/2016 | Lee | F16D 23/12 192/35 |
| 2016/0238089 A1* | 8/2016 | Lee | F16D 43/00 |
| 2017/0198758 A1 | 7/2017 | Ince | |
| 2017/0198761 A1 | 7/2017 | Ince et al. | |

FOREIGN PATENT DOCUMENTS

GB          950728       * 2/1964

* cited by examiner

*Primary Examiner* — Mark A Manley (57) ABSTRACT

A radial wedge clutch, including: an axis of rotation; a shaft; an outer ring located radially outward of the shaft; a cage radially disposed between the shaft and the outer ring; a plurality of circumferentially aligned wedge plate segments radially disposed between the shaft and the outer ring; at least one resilient element urging the plurality of circumferentially aligned wedge plate segments radially outwardly; and an actuation plate axially displaceable in a first axial direction to engage the cage and rotate the cage and the plurality of circumferentially aligned wedge plate segments.

20 Claims, 10 Drawing Sheets

RADIAL WEDGE PLATE CLUTCH

TECHNICAL FIELD

The present invention relates generally to a wedge clutch, and more specifically, to a wedge clutch including: a non-tapered hub with a plurality of circumferential ramps; a plurality of circumferentially aligned wedge plate segments partially contained within a cage and with respective circumferential ramps; and at least one resilient element urging the wedge plate segments radially outwardly into contact with an outer ring for the clutch.

BACKGROUND

For a known all wheel drive disconnect clutch design, an inner shaft rotates and the engagement or disengagement is to an outer ring gear. A wedge plate or wedge plate segments are mounted on an outer tapered surface of a hub, which is mounted to the rotating shaft. Centrifugal forces from shaft rotation causes the wedge plate or wedge plate segments to displace radially outwardly, resulting in an unintentional lock-up of the clutch. The stress due to excessive expansion and contraction can cause wedge plates or wedge plate segments to fracture. Another problem of the prior art design is a taper for the hub. In a connect mode for the clutch, the taper results in large axial forces urging the hub out of the connect mode, causing the locking mechanism to slip and limiting the torque carrying capability of the clutch. To prevent the slippage, a large activation force is needed to counter the large axial force.

SUMMARY

According to aspects illustrated herein, there is provided a radial wedge clutch, including: an axis of rotation; a shaft; an outer ring located radially outward of the shaft; a cage radially disposed between the shaft and the outer ring; a plurality of circumferentially aligned wedge plate segments radially disposed between the shaft and the outer ring; at least one resilient element urging the plurality of circumferentially aligned wedge plate segments radially outwardly; and an actuation plate axially displaceable in a first axial direction to engage the cage and rotate the cage and the plurality of circumferentially aligned wedge plate segments.

According to aspects illustrated herein, there is provided a radial wedge clutch, including: an axis of rotation; a shaft; an outer ring located radially outward of the shaft; a cage radially disposed between the shaft and the outer ring; a plurality of circumferentially aligned wedge plate segments radially disposed between the shaft and the outer ring and axially bracketed by the cage; at least one resilient element engaged with the cage and the plurality of circumferentially aligned wedge plate segments and urging the plurality of circumferentially aligned wedge plate segments radially outwardly into contact with the outer ring; and an actuation plate non-rotatably connected to the shaft. For a connect mode for the radial wedge clutch, the shaft, the plurality of circumferentially aligned wedge plate segments, and the outer ring are non-rotatably connected. To initiate the connect mode: the actuation plate is displaceable in a first axial direction to engage the cage and to rotate the cage and the plurality of circumferentially aligned wedge plate segments, with respect to the outer ring; and the outer ring displaces the plurality of circumferentially aligned wedge plate segments radially inwardly to non-rotatably connect to the shaft.

According to aspects illustrated herein, there is provided a radial wedge clutch, including: an axis of rotation; a shaft; an outer ring located radially outward of the shaft; a cage radially disposed between the shaft and the outer ring; a plurality of circumferentially aligned wedge plate segments radially disposed between the shaft and the outer ring and axially bracketed by the cage; at least one resilient element engaged with the cage and the plurality of circumferentially aligned wedge plate segments and urging the plurality of circumferentially aligned wedge plate segments radially outwardly into contact with the outer ring; and an actuation plate non-rotatably connected to the shaft. For a connect mode for the radial wedge clutch, the actuation plate is displaceable in a first axial direction to non-rotatably connect the shaft, the plurality of circumferentially aligned wedge plate segments, and the outer ring. For a disconnect mode for the radial wedge clutch, the shaft is rotatable with respect to the outer ring. To transition from the connect mode to the disconnect mode: the actuation plate is displaceable in a second axial direction, opposite the first axial direction, to disengage from the cage; the shaft rotates in a second circumferential direction, opposite the first circumferential direction; the respective second ramps slide along the plurality of first ramps in the second circumferential direction; and the at least one resilient element displaces the plurality of circumferentially aligned wedge plate segments radially outwardly and out of contact with the shaft.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 10:
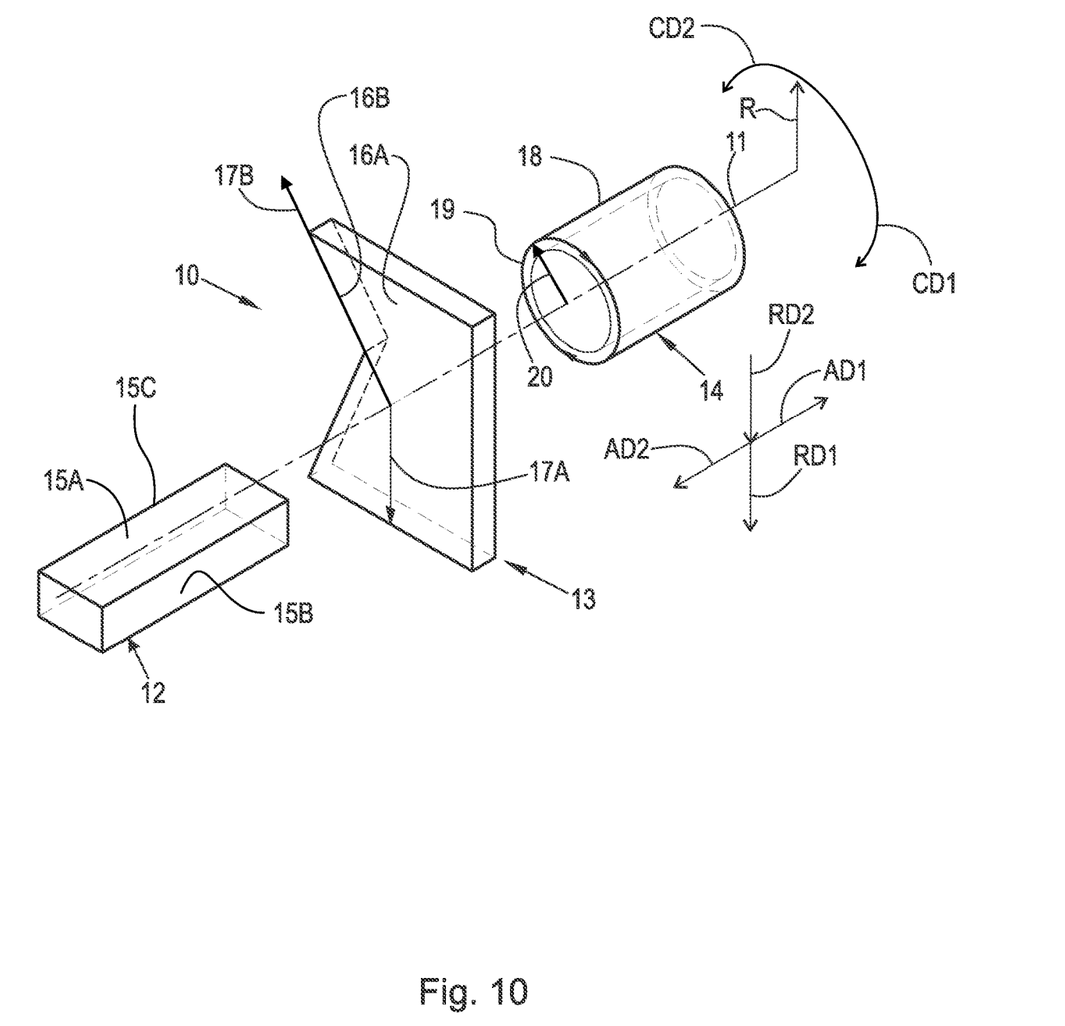
FIG. 10 is a perspective view of a cylindrical coordinate system demonstrating spatial terminology used in the present application.

FIG. 10 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
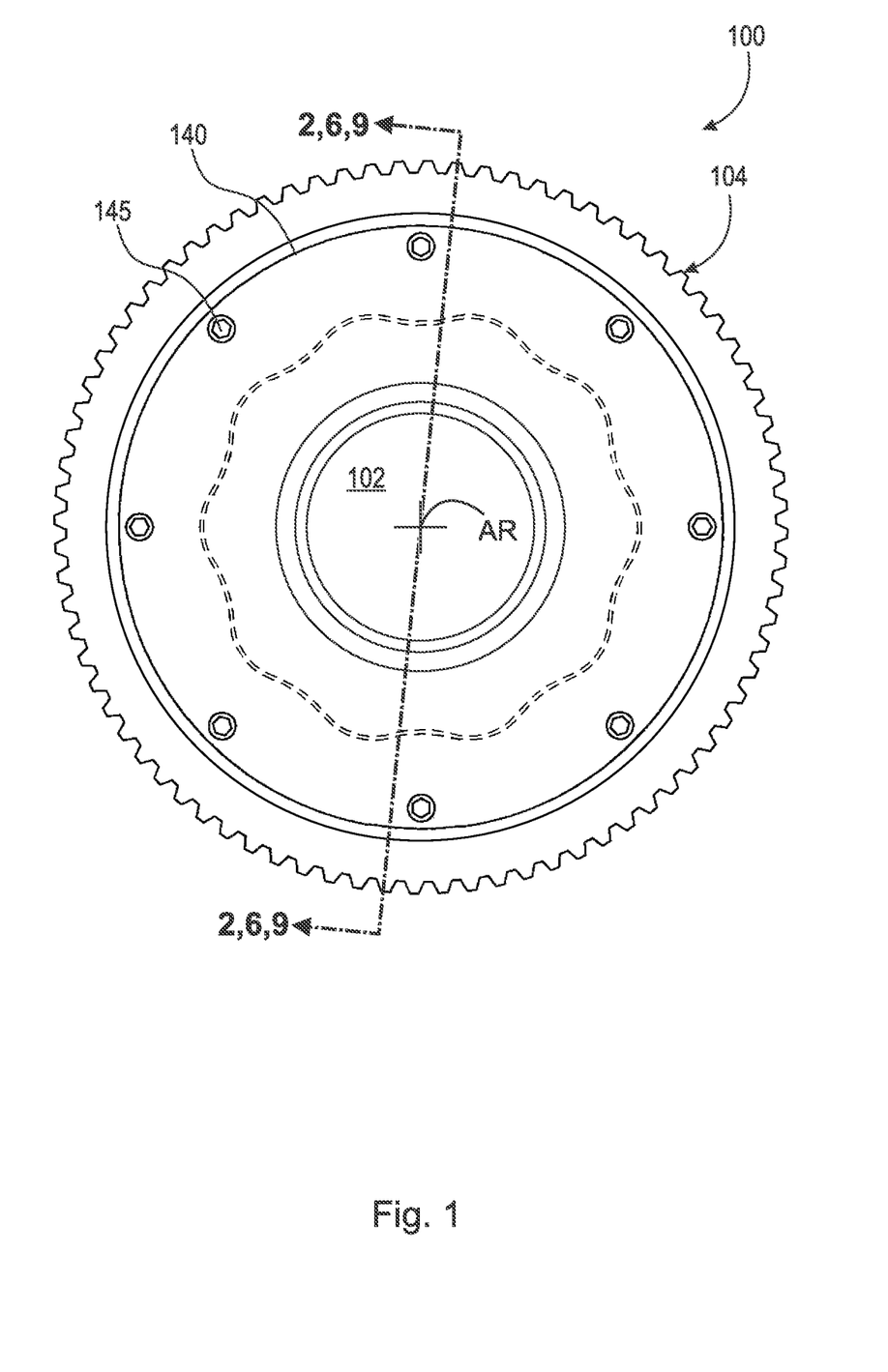
FIG. 1 is a front view of a radial wedge clutch.

FIG. 1 is a front view of radial wedge clutch 100.

Figure 2:
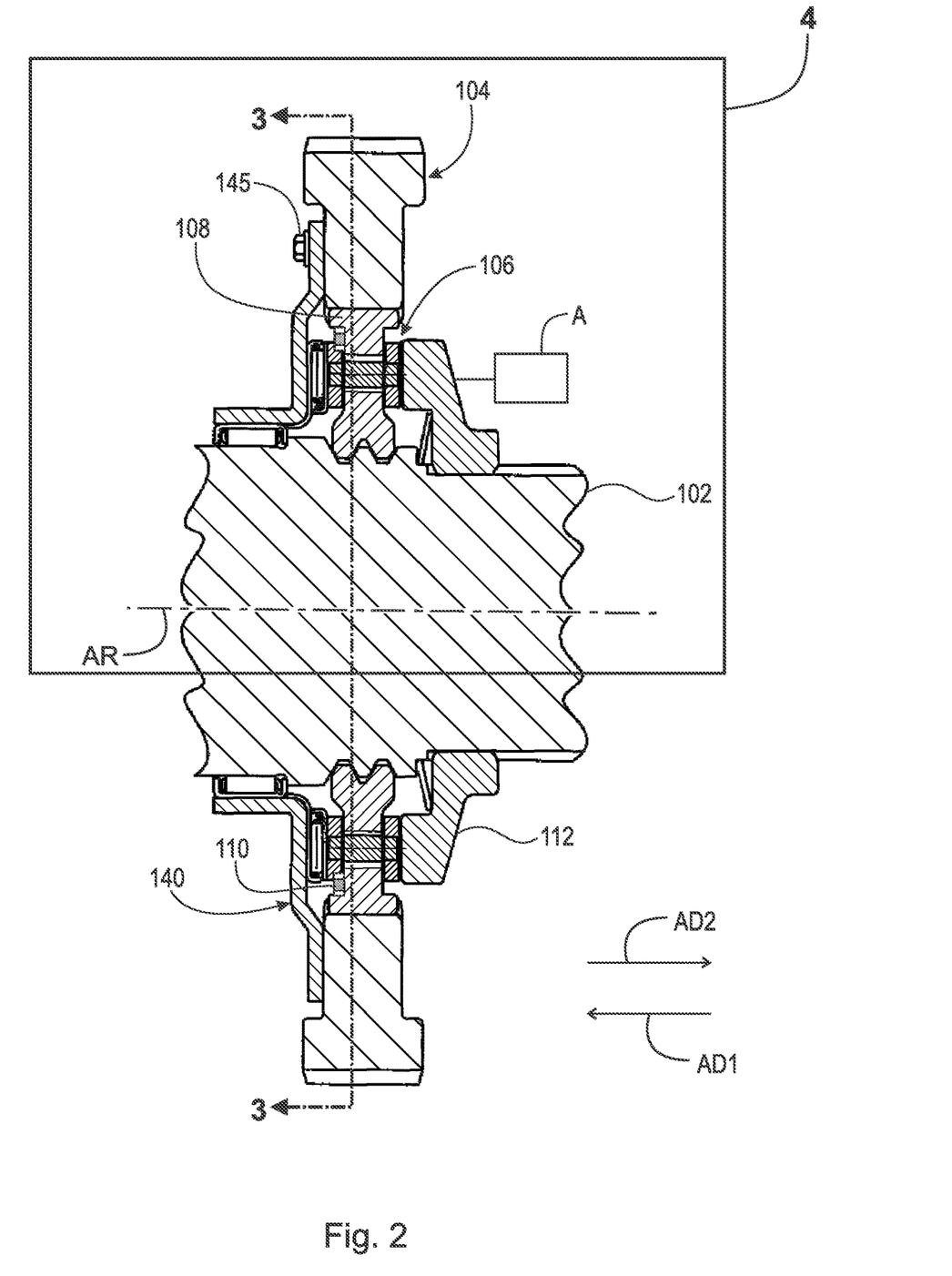
FIG. 2 is a cross-sectional view generally along line 2, 6, 9-2, 6, 9 in FIG. 1 with the radial wedge clutch in a disconnect mode.

FIG. 2 is a cross-sectional view generally along line 2, 6, 9-2, 6, 9 in FIG. 1 with radial clutch 100 in a disconnect mode.

Figure 3:
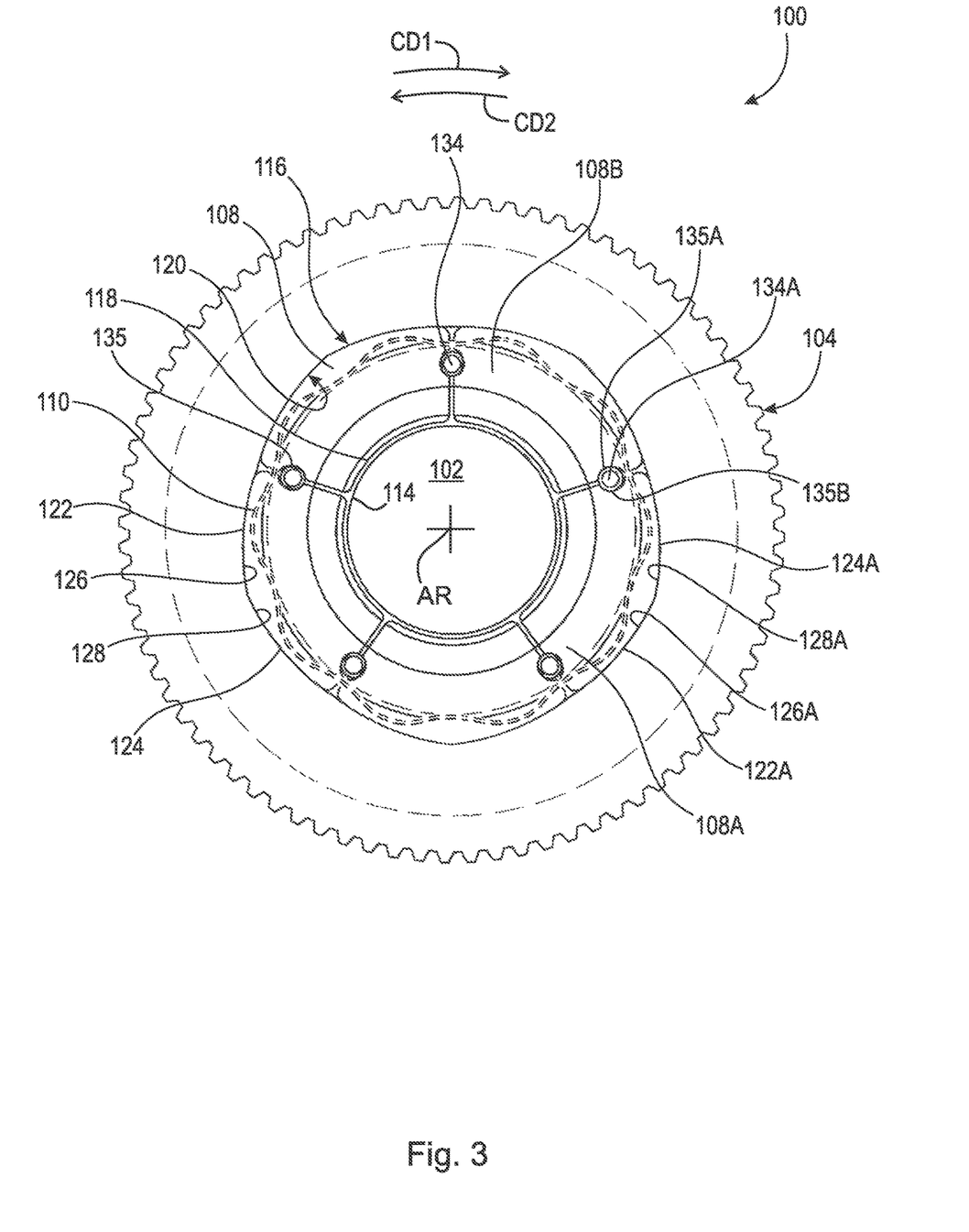
FIG. 3 is a cross-sectional view generally along line 3-3 in FIG. 2.

FIG. 3 is a cross-sectional view generally along line 3-3 in FIG. 2.

Figure 4:
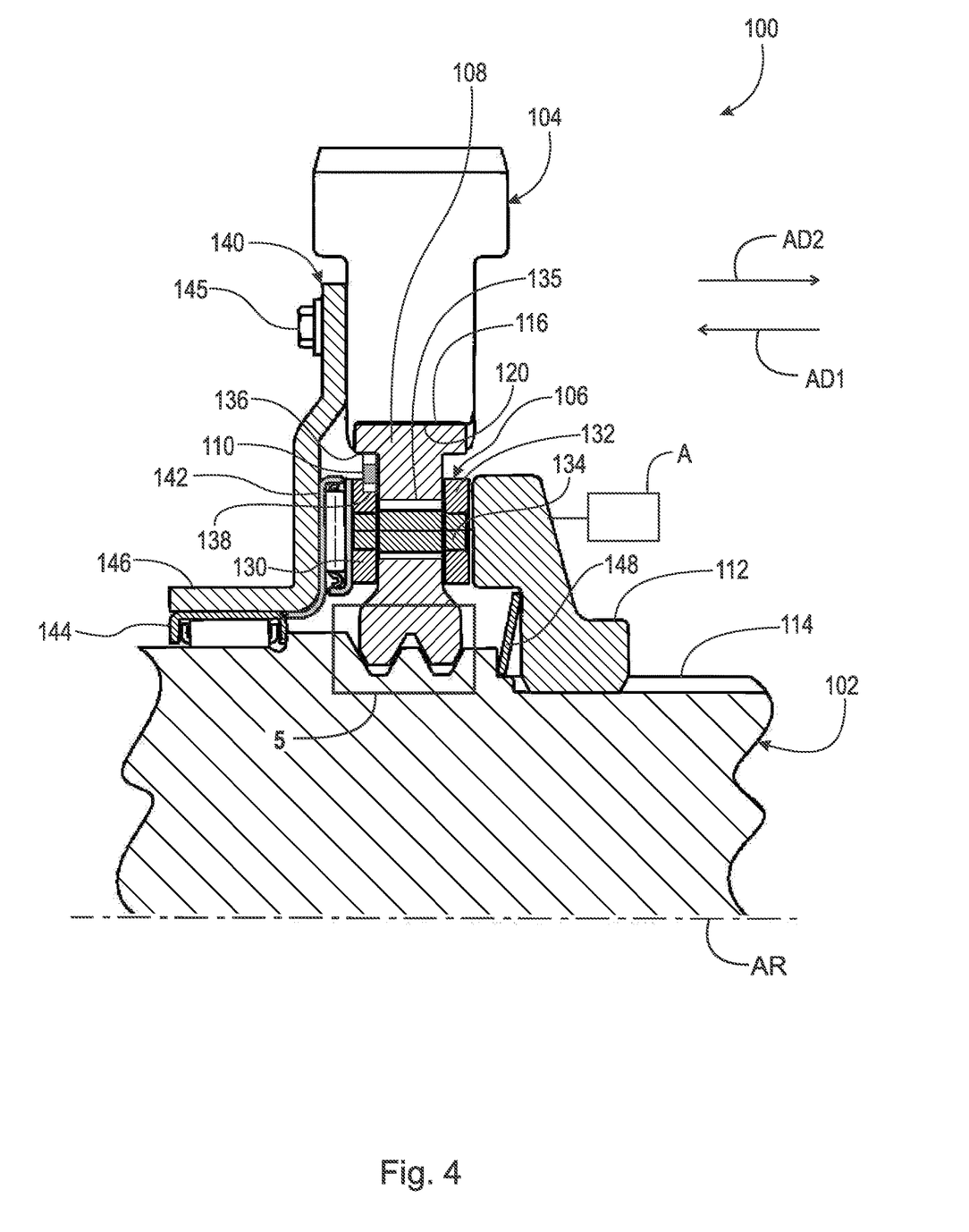
FIG. 4 is a detail of area 4 in FIG. 2.

FIG. 4 is a detail of area 4 in FIG. 2. The following should be viewed in light of FIGS. 1 through 4. Wedge clutch 100 includes: axis of rotation AR; shaft 102 rotatable about axis AR; outer ring 104 located radially outward of shaft 102; cage 106 radially disposed between shaft 102 and outer ring 104; circumferentially aligned wedge plate segments 108 radially disposed between shaft 102 and outer ring 104; at least one resilient element 110; and actuation plate 112. In an example embodiment, element 110 is a wave spring. In an example embodiment, element 110 is a circumferentially continuous resilient element.

Resilient element 110 is engaged with cage 106 and segments 108 and urges segments 108 radially outwardly with respect to cage 106 and shaft 102. In an example embodiment, element 110 is in contact with one or both of cage 106 and segments 108. Plate 112 is non-rotatably connected to shaft 102 and is axially displaceable with respect to shaft 102. By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Shaft 102 includes radially outer surface 114, ring 104 includes radially inner surface 116, and each segment 108 includes radially inner surface 118 and radially outer surface 120. Surface 116 includes: ramps 122 sloping radially inwardly in direction CD1; and ramps 124 sloping radially inwardly in direction CD2, opposite direction CD1. Each surface 120 includes: ramp 126 sloping radially inwardly in direction CD1; and ramp 128 sloping radially inwardly in direction CD2.

In an example embodiment cage 106 includes radially disposed flanges 130 and 132 and fasteners 134 connecting flanges 130 and 132 and circumferentially aligned with segments 108. Resilient element 110 urges segments 108 radially outwardly with respect to flanges 130 and 132. Segments 108 are axially disposed between (axially bracketed by) flanges 130 and 132. In an example embodiment, segments 108 include slots 135 and each fastener 134 is disposed in respective slots 135 and is circumferentially disposed between a respective pair of circumferentially adjacent segments 108. For example, fastener 134A is in slots 135A and 135B and is between segments 108A and 108B. In general, a reference character "[number][digit][digit][letter]" designates a specific example of an element labeled as "[digit][digit][digit]." For example, segment 108A is a specific example from among segments 108.

Flanges 130 and 132 and fasteners 134 guide displacement of segments 108. For example: flanges 130 and 132 axially fix segments 108; fasteners 134 block circumferential displacement of segments 108 with respect to each other; as further described below, fasteners 134 circumferentially displace segments 108; and as further described below, fasteners 134 and slots 135 enable radial displacement of segments 108. In an example embodiment, resilient element 110 is engaged with respective shoulders 136 for segments 108 and shoulder 138 for flange 130.

In an example embodiment, clutch 100 includes support plate 140, axial bearing, or washer 142, and radial bearing 144. Plate 140 is fixedly connected to ring 104, for example with fasteners 145. Bearing 142 is axially disposed between plate 140 and flange 130 and acts as a thrust bearing when plate 112 is displaced in direction AD1, as described below. Bearing 142 blocks displacement of cage 106 in direction AD1 while enabling rotation between ring 104 and cage 106. Bearing 144 is radially disposed between shaft 102 and flange 146 for plate 140 and enables rotation between shaft 102 and ring 104, for example in the disconnect mode described below. In an example embodiment, clutch 100 includes resilient element 148 engaged with shaft 102 and plate 112 and urging plate 112 in direction AD2.

Figure 5:
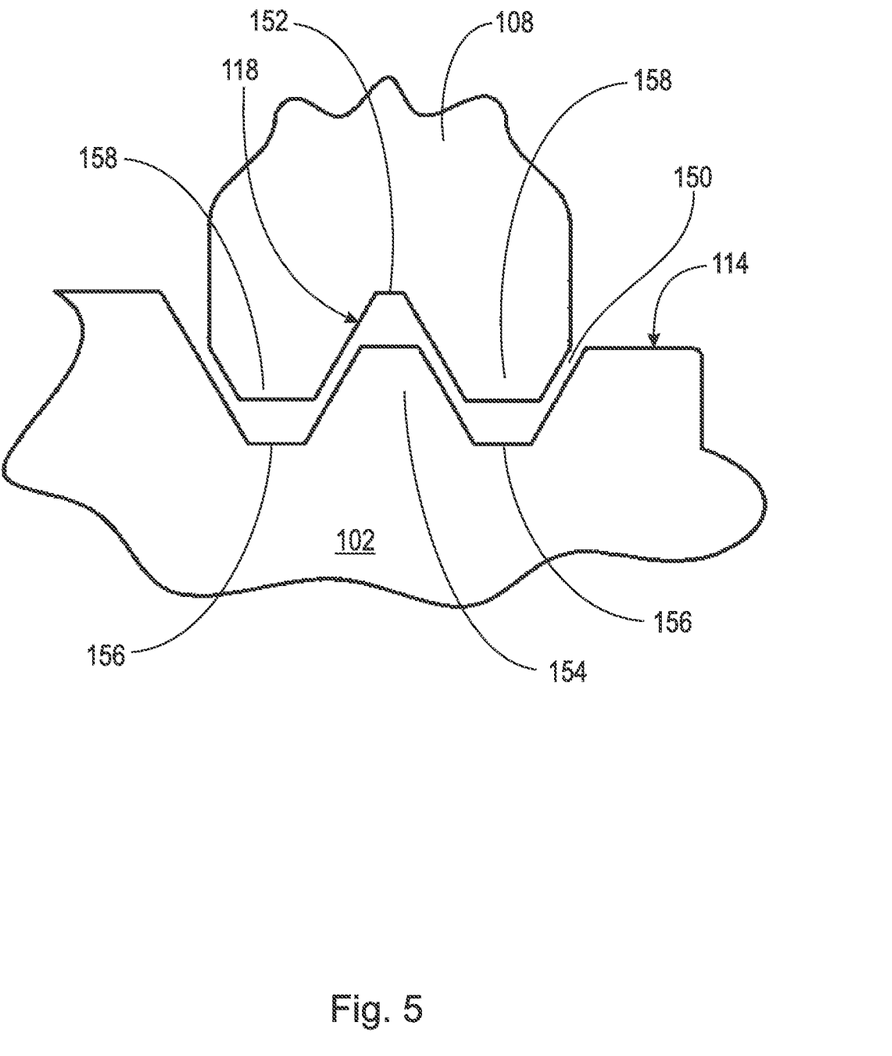
FIG. 5 is a detail of area 5 in FIG. 4.

FIG. 5 is a detail of area 5 in FIG. 4. The following should be viewed in light of FIGS. 1 through 5. The following provides further detail regarding the structure and operation of clutch 100. In the disconnect mode for radial wedge clutch 100 shown in FIGS. 2 through 5: resilient element 148 has displaced plate 112 in direction AD2 (actuator A is not urging plate 112 in direction AD1); plate 112 is not engaged with cage 106, or there is nominal engagement between plate 112 and cage 106, enabling shaft 102 and plate 112 to rotate with respect to cage 106; shaft 102 is rotatable with respect to outer ring 104 in opposite circumferential directions CD1 and CD2; and surfaces 118 are free of contact with surface 114. For example, resilient element 110 urges segments 108 radially outwardly to create gap 150 between each surface 118 and surface 114.

In an example embodiment, each surface 118 includes radially outwardly extending groove 152 and surface 114 includes radially outwardly extending protrusion 154 disposed in groove 152. In an example embodiment, surface 114 includes radially inwardly extending groove 156 and each surface 118 includes radially inwardly extending protrusion 158 disposed in groove 156.

In the disconnect mode, resilient element 110 urges segments 108 radially outwardly such that each ramp 122 is in contact with a respective ramp 126 and each ramp 124 is in contact with a respective ramp 128. For example, ramp 122A is in contact with ramp 126A, and ramp 124A is in contact with ramp 128A.

Figure 6:
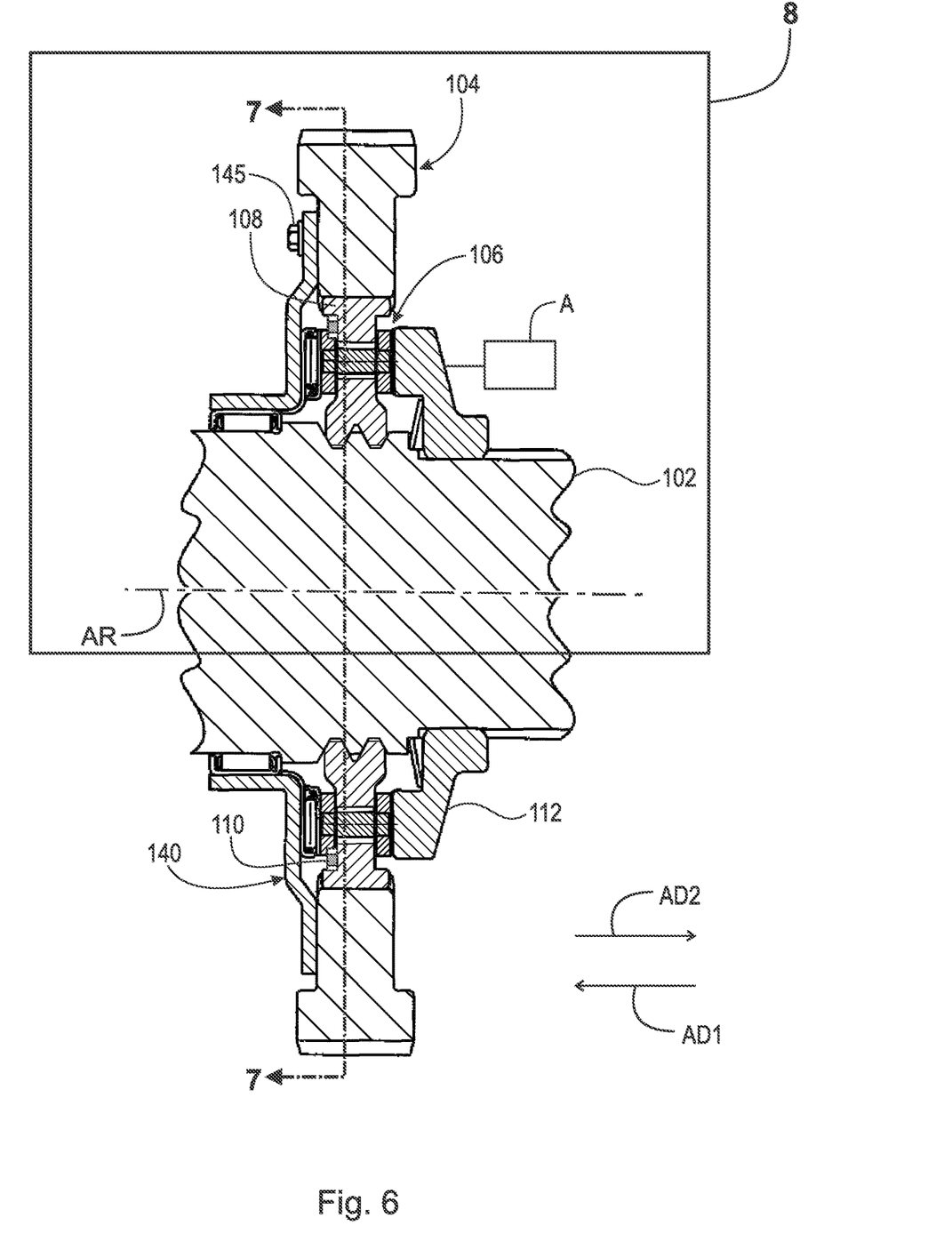
FIG. 6 is a cross-sectional view generally along line 2, 6, 9-2, 6, 9 in FIG. 1 with the radial wedge clutch in a connect mode.

FIG. 6 is a cross-sectional view generally along line 2, 6, 9-2, 6, 9 in FIG. 1 with radial wedge clutch 100 in a connect mode.

Figure 7:
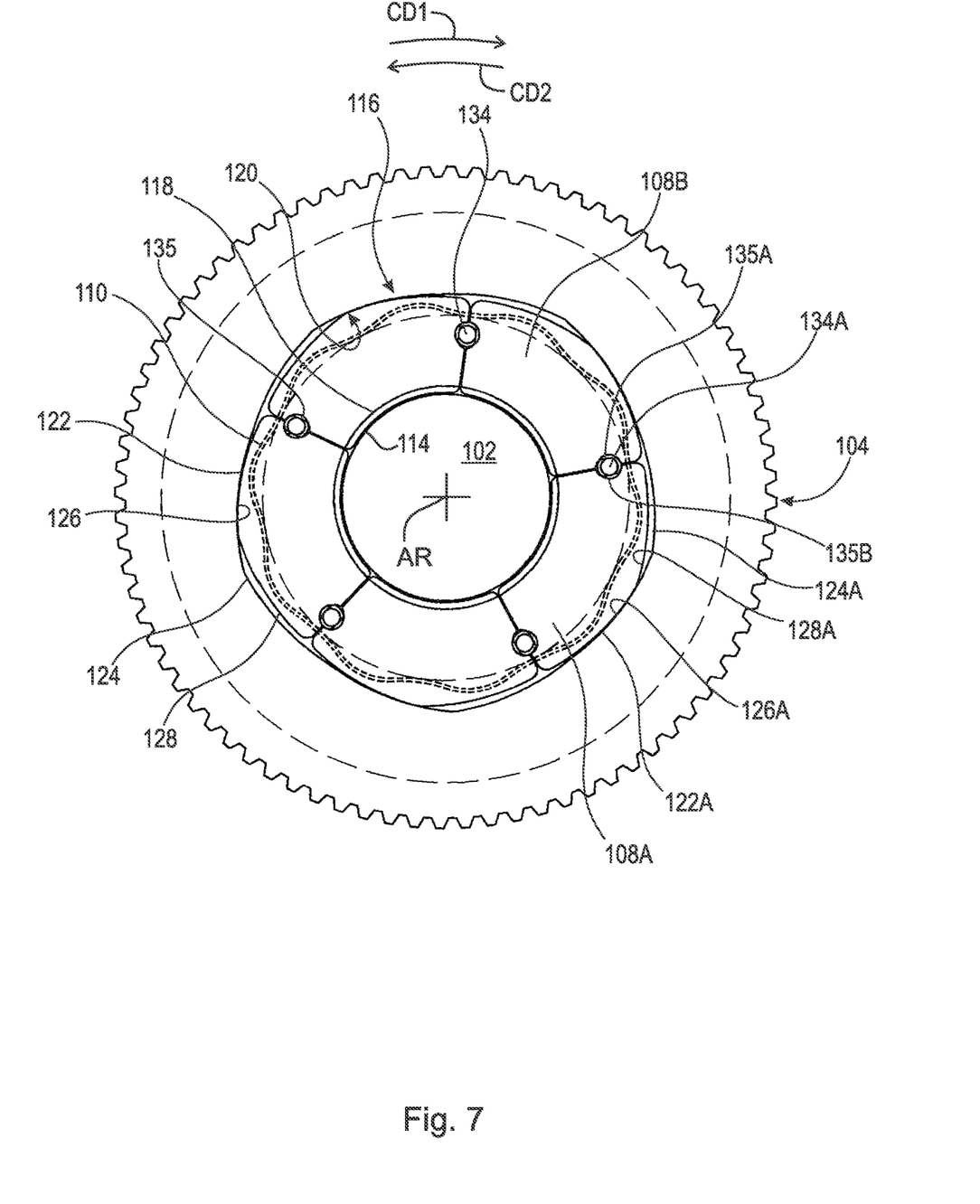
FIG. 7 is a cross-sectional view generally along line 7-7 in FIG. 6.

FIG. 7 is a cross-sectional view generally along line 7-7 in FIG. 6.

Figure 8:
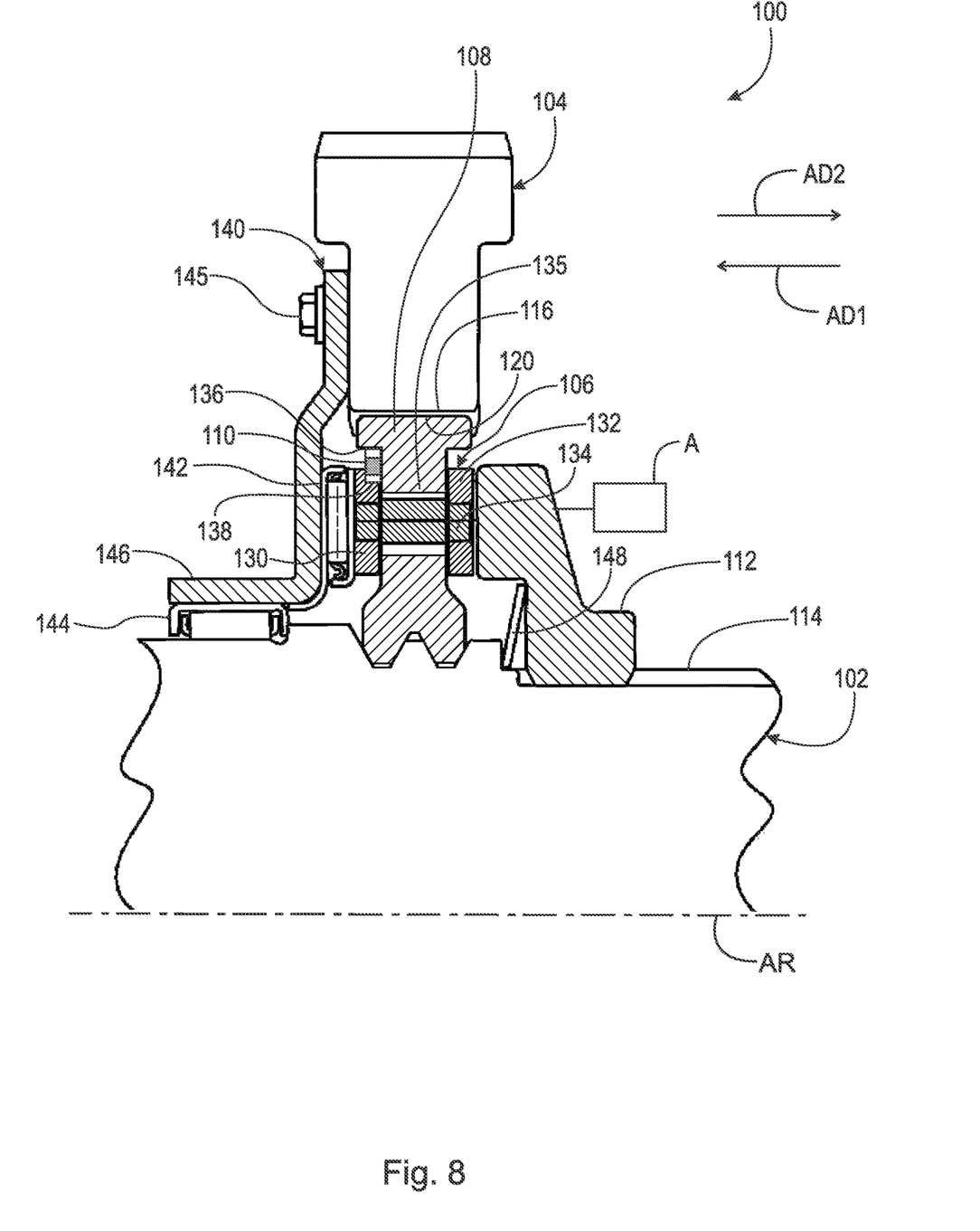
FIG. 8 is a detail of area 8 in FIG. 6.

FIG. 8 is a detail of area 8 in FIG. 6. The following should be viewed in light of FIGS. 1 through 8. In a connect mode for clutch 100, shaft 102, segments 108, and ring 104 are non-rotatably connected. Clutch 100 can transition, from the disconnect mode of FIGS. 2 through 5, to the connect mode for rotation of shaft 102 in direction CD1 or in direction CD2. For FIGS. 6 through 8, rotation of shaft 102 is in direction CD1 from the disconnect mode of FIGS. 2 through 5. To transition from the disconnect mode to the connect mode: actuation plate 112 is axially displaced, for example by actuator A, in axial direction AD1 to: engage cage 106, for example: directly contact cage 106; contact friction material (not shown) non-rotatably connected to cage 106; or contact cage 106 with friction material (not shown) non-rotatably connected to plate 112. The engagement of plate 112 and cage 106 rotates cage 106, rotation of cage 106 rotates fasteners 134, and fasteners 134 contact segments 108 to rotate segments 108 in circumferential direction CD1.

In particular, actuation plate 112 engages cage 106 to rotate flange 132, and via fasteners 134, flange 130 in direction CD1. Thus, shaft 102, cage 106, and segments 108 rotate, with respect to ring 104, in circumferential direction CD1. Rotation of segments 108 in direction CD1 causes ramps 126 to slide radially inwardly along ramps 122 in direction CD1, displacing segments 108 radially inwardly, with respect to ring 104 and cage 106, to non-rotatably connect surfaces 114 and 118. For example, ramp 126A slides radially inwardly along ramp 122A.

Slots 135 are configured such that circumferentially adjacent segments 108 have little or no circumferential displacement with respect to each other, forcing ramps 126 to slide along ramps 122 in response to rotation of segments 108 in direction CD1, while simultaneously enabling the radial displacement of segments 108 necessary for ramps 126 to slide along ramps 122. Continued rotation of shaft 102, cage 106 and segments 108 in direction CD1 non-rotatably connects surfaces 120 to surface 116 and surfaces 118 to surface 114. In an example embodiment, actuator A is deactivated once the connect mode is attained and resilient element 148 displaces plate 112 in direction AD2 to disengage plate 112 from cage 106. Continued rotation of shaft 102 in direction CD1 maintains the connect mode without the need to use actuator A.

To transition from the connect mode of FIGS. 6 through 8 to the disconnect mode of FIGS. 2 through 5, shaft 102 rotates in direction CD2, causing ramps 126 to slide radially outwardly along ramps 122 in direction CD2 as segments 108 are simultaneously urged radially outwardly by resilient element 110. As segments 108 displace radially outwardly, surfaces 118 separate from surface 114, creating gap 150. In general, clutch 100 transitions from the connect mode to the disconnect mode when the direction of rotation of shaft 102 is reversed.

Figure 9:
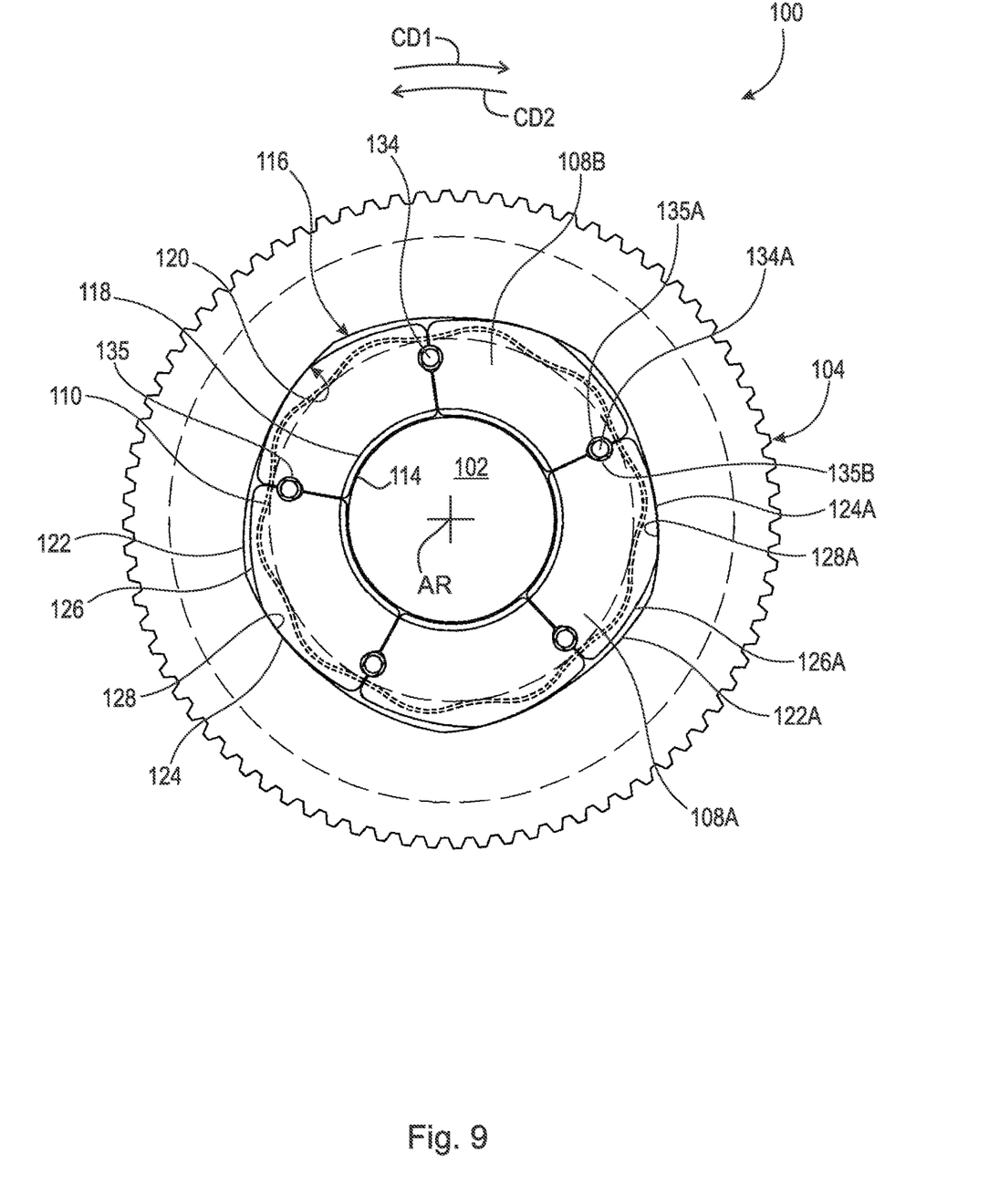
FIG. 9 is a cross-sectional view generally along line 2, 6, 9-2, 6, 9 in FIG. 1 with the radial wedge clutch in a connect mode.

FIG. 9 is a cross-sectional view generally along line 2, 6, 9-2, 6, 9 in FIG. 1 with radial wedge clutch 100 in a connect mode. The following should be viewed in light of FIGS. 1 through 9. For FIG. 9, rotation of shaft 102 is in direction CD2 from the disconnect mode of FIGS. 2 through 5. To transition from the disconnect mode to the connect mode: actuation plate 112 is axially displaced, for example by actuator A, in axial direction AD1 to: engage cage 106, for example: directly contact cage 106; contact friction material (not shown) non-rotatably connected to cage 106; or contact cage 106 with friction material (not shown) non-rotatably connected to plate 112. The engagement of plate 112 and cage 106 rotates cage 106, rotation of cage 106 rotates fasteners 134, and fasteners 134 contact segments 108 to rotate segments 108 in circumferential direction CD2.

In particular, actuation plate 112 engages cage 106 to rotate flange 132, and via fasteners 134, flange 130 in direction CD2. Thus, shaft 102, cage 106, and segments 108 rotate, with respect to ring 104, in circumferential direction CD2. Rotation of segments 108 in direction CD2 causes ramps 128 to slide radially inwardly along ramps 124 in direction CD2, displacing segments 108 radially inwardly, with respect to ring 104 and cage 106, to non-rotatably connect surfaces 114 and 118. For example, ramp 128A slides radially inwardly along ramp 124A.

Continued rotation of shaft 102, cage 106 and segments 108 in direction CD2 non-rotatably connects surfaces 120 to surface 116 and surfaces 118 to surface 114. In an example embodiment, actuator A is deactivated once the connect mode is attained and resilient element 148 displaces plate 112 in direction AD2 to disengage plate 112 from cage 106. Continued rotation of shaft 102 in direction CD2 maintains the connect mode without the need to use actuator A.

To transition from the connect mode of FIG. 9 to the disconnect mode of FIGS. 2 through 5, shaft 102 rotates in direction CD1, causing ramps 128 to slide radially outwardly along ramps 124 in direction CD2 as segments 108 are simultaneously urged radially outwardly by resilient element 110. As segments 108 displace radially outwardly, surfaces 118 separate from surface 114, creating gap 150.

Although five segments 108 are shown in the figures, it should be understood that clutch 100 is not limited to a particular number of segments 108 and that other numbers of segments 108 are possible.

Clutch 100 solves the problem noted above of axial loading on a hub for a radial wedge clutch. For example, the hub taper noted above is removed and grooves 152 and/or 156 in combination with protrusions 154 and/or 158 block axial displacement of segments 108 while clutch 100 is in the connect mode. Clutch 100 solves the problem noted above of unintended transition to the connect mode while in the disconnect mode. For example, resilient element 110 urges segments 108 radially outwardly into contact with ring 104 to prevent contact between shaft 102 and segments 108, which in turn prevents ramps 126 or 128 from sliding along ramps 122 or 126, respectively, and transitioning clutch 100 to the connect mode.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
A actuator
AR axis of rotation
100 radial wedge clutch
102 shaft
104 outer race
106 cage
108 circumferentially aligned wedge plate segments
108A circumferentially aligned wedge plate segments
108B circumferentially aligned wedge plate segments
110 resilient element
112 actuation plate
114 radially outer surface, shaft 102
116 radially inner surface, ring 104
118 radially inner surface, segment 108
120 radially outer surface, segment 108
122 ramp, ring 104
122A ramp, ring 104
124 ramp, ring 104
124A ramp, ring 104
126 ramp, segment 108
126A ramp, segment 108
128 ramp, segment 108
128A ramp, segment 108
130 flange
132 flange
134 fastener
134A fastener
135 slot, segment 108
135A slot, segment 108
135B slot, segment 108
136 shoulder, segment 108
138 shoulder, flange 130
140 support plate
142 axial bearing or washer
144 radial bearing
145 fastener
146 flange
148 resilient element
150 gap
152 groove, segment 108
154 protrusion, shaft 102
156 groove, shaft 102
158 protrusion, segment 108

The invention claimed is:

1. A radial wedge clutch, comprising:
an axis of rotation;
a shaft;
an outer ring located radially outward of the shaft;
a cage radially disposed between the shaft and the outer ring;
a plurality of circumferentially aligned wedge plate segments radially disposed between the shaft and the outer ring;
at least one resilient element urging the plurality of circumferentially aligned wedge plate segments radially outwardly; and,
an actuation plate axially displaceable in a first axial direction to:
engage the cage; and,
rotate the cage and the plurality of circumferentially aligned wedge plate segments.

2. The radial wedge clutch of claim 1, wherein:
the at least one resilient element is in contact with the cage and the plurality of circumferentially aligned wedge plate segments; and,
the actuation plate is non-rotatably connected to the shaft.

3. The radial wedge clutch of claim 1, wherein:
in a connect mode for the radial wedge clutch, the shaft, the plurality of circumferentially aligned wedge plate segments, and the outer ring are non-rotatably connected; and,
to initiate the connect mode, the actuation plate is axially displaceable in the first axial direction to:
non-rotatably connect to the cage; and
rotate the shaft, the cage, and the plurality of circumferentially aligned wedge plate segments, with respect to the outer ring.

4. The radial wedge clutch of claim 1, wherein:
the cage includes first and second radially disposed flanges;
the plurality of circumferentially aligned wedge plate segments is axially disposed between the first and second radially disposed flanges; and,
the at least one resilient element urges the plurality of circumferentially aligned wedge plate segments radially outwardly with respect to the first and second radially disposed flanges.

5. The radial wedge clutch of claim 4, wherein:
the cage includes a plurality of fasteners:
connecting the first and second radially disposed flanges; and,
circumferentially aligned with the plurality of circumferentially aligned wedge plate segments;
the plurality of fasteners blocks rotation of the plurality of circumferentially aligned wedge plate segments with respect to the cage; and,
the plurality of circumferentially aligned wedge plate segments is displaceable in a radial direction with respect to the plurality of fasteners.

6. The radial wedge clutch of claim 5, wherein each fastener is circumferentially disposed between a respective pair of circumferentially adjacent circumferentially aligned wedge plate segments.

7. The radial wedge clutch of claim 1, wherein:
   each circumferentially aligned wedge plate segment includes a radially inner surface with a radially outwardly extending groove; and,
   the shaft includes a radially outer surface with a radially outwardly extending protrusion disposed in the radially outwardly extending groove; or,
wherein:
   the shaft includes a radially outer surface with a radially inwardly extending groove; and,
   each circumferentially aligned wedge plate segment includes a radially inner surface with a radially inwardly extending protrusion disposed in the radially inwardly extending groove.

8. The radial wedge clutch of claim 1, wherein:
   in a connect mode for the radial wedge clutch, the shaft, the plurality of circumferentially aligned wedge plate segments and the outer ring are non-rotatably connected;
   the outer ring includes a radially inner surface;
   the radially inner surface includes a plurality of first ramps, each first ramp sloping radially inwardly along a first circumferential direction;
   each circumferentially aligned wedge plate segment includes a radially outer surface;
   each radially outer surface includes a second ramp, the second ramp sloping radially inwardly along the first circumferential direction; and,
   to initiate the connect mode:
      the cage rotates the plurality of circumferentially aligned wedge plate segments to slide the second ramps along the plurality of first ramps in the first circumferential direction; and,
      the plurality of first ramps displaces the plurality of circumferentially aligned wedge plate segments radially inwardly.

9. The radial wedge clutch of claim 8, wherein:
   in a disconnect mode for the radial wedge clutch, the shaft is rotatable with respect to the outer ring; and,
   to transition from the connect mode to the disconnect mode:
      the shaft rotates in a second circumferential direction, opposite the first circumferential direction; and,
      the at least one resilient element pushes the plurality of circumferentially aligned wedge plate segments radially outwardly to separate the plurality of circumferentially aligned wedge plate segments from the shaft.

10. The radial wedge clutch of claim 9, further comprising:
   a first resilient element urging the actuation plate in a second axial direction, opposite the first axial direction, wherein to transition from the connect mode to the disconnect mode, the first resilient element displaces the actuation plate in the second axial direction.

11. The radial wedge clutch of claim 8, wherein:
   the radially inner surface includes a plurality of third ramps, each third ramp sloping radially inwardly along a second circumferential direction, opposite the first circumferential direction;
   said each radially outer surface includes a fourth ramp sloping radially inwardly along the second circumferential direction; and,
   to initiate the connect mode:
      the cage rotates the plurality of circumferentially aligned wedge plate segments to slide the fourth ramps along the plurality of third ramps in the second circumferential direction; and,
      the plurality of third ramps displaces the plurality of circumferentially aligned wedge plate segments radially inwardly.

12. The radial wedge clutch of claim 11, wherein:
   in a disconnect mode for the radial wedge clutch, the shaft is rotatable with respect to the outer ring; and,
   to transition from the connect mode to the disconnect mode:
      the shaft rotates in the first circumferential direction; and,
      the at least one resilient element pushes the plurality of circumferentially aligned wedge plate segments radially outwardly to separate the plurality of circumferentially aligned wedge plate segments from the shaft.

13. The radial wedge clutch of claim 12, further comprising:
   a first resilient element engaged with the shaft and the actuation plate and urging the actuation plate in a second axial direction, opposite the first axial direction, wherein to transition from the connect mode to the disconnect mode, the first resilient element displaces the actuation plate in the second axial direction.

14. The radial wedge clutch of claim 1, wherein in a disconnect mode for the radial wedge clutch:
   the shaft is rotatable with respect to the outer ring; and,
   the plurality of circumferentially aligned wedge plate segments is free of contact with the shaft.

15. The radial wedge clutch of claim 1, further comprising:
   a support plate fixedly secured to the outer ring;
   a first bearing or a washer disposed between the support plate and the cage; and,
   a second bearing in contact with the shaft and the support plate, wherein the actuation plate is displaceable in the first axial direction to displace the cage into contact with the first bearing or the washer.

16. A radial wedge clutch, comprising:
   an axis of rotation;
   a shaft;
   an outer ring located radially outward of the shaft;
   a cage radially disposed between the shaft and the outer ring;
   a plurality of circumferentially aligned wedge plate segments radially disposed between the shaft and the outer ring and axially bracketed by the cage;
   at least one resilient element:
      engaged with the cage and the plurality of circumferentially aligned wedge plate segments; and,
      urging the plurality of circumferentially aligned wedge plate segments radially outwardly into contact with the outer ring; and,
   an actuation plate non-rotatably connected to the shaft, wherein:
      for a connect mode for the radial wedge clutch, the shaft, the plurality of circumferentially aligned wedge plate segments, and the outer ring are non-rotatably connected; and,
      to initiate the connect mode:

the actuation plate is displaceable in a first axial direction to engage the cage and to rotate the cage and the plurality of circumferentially aligned wedge plate segments with respect to the outer ring; and, the outer ring displaces the plurality of circumferentially aligned wedge plate segments radially inwardly to non-rotatably connect to the shaft.

17. The radial wedge clutch of claim 16, wherein:

each circumferentially aligned wedge plate segment includes a radially inner surface with a radially outwardly extending groove; and, the shaft includes a radially outer surface with a radially outwardly extending protrusion disposed in the radially outwardly extending groove; or, wherein:

the shaft includes a radially outer surface with a radially inwardly extending groove; and, each circumferentially aligned wedge plate segment includes a radially inner surface with a radially inwardly extending protrusion disposed in the radially inwardly extending groove.

18. The radial wedge clutch of claim 16, wherein:

the cage includes:

first and second radially disposed flanges; and, a plurality of fasteners connecting the first and second radially disposed flanges;

the plurality of circumferentially aligned wedge plate segments is axially disposed between the first and second radially disposed flanges;

each fastener is circumferentially disposed between a respective pair of circumferentially adjacent circumferentially aligned wedge plate segments;

the plurality of fasteners blocks rotation of the plurality of circumferentially aligned wedge plate segments with respect to the cage; and, the plurality of circumferentially aligned wedge plate segments is displaceable, in a radial direction, with respect to the plurality of fasteners.

19. The radial wedge clutch of claim 16, wherein:

the outer ring includes a radially inner surface;

the radially inner surface includes a plurality of first ramps, each first ramp sloping radially inwardly along a first circumferential direction;

each circumferentially aligned wedge plate segment includes a radially outer surface;

each radially outer surface includes a second ramp sloping radially inwardly along the first circumferential direction; and, to initiate the connect mode:

the second ramps slide along the plurality of first ramps in the first circumferential direction; and, the plurality of first ramps displaces the plurality of circumferentially aligned wedge plate segments radially inwardly.

20. A radial wedge clutch, comprising:

an axis of rotation;

a shaft;

an outer ring located radially outward of the shaft and including a plurality of first ramps;

a cage radially disposed between the shaft and the outer ring;

a plurality of circumferentially aligned wedge plate segments radially disposed between the shaft and the outer ring and axially bracketed by the cage, each circumferentially aligned wedge plate segment including a second ramp;

at least one resilient element:

engaged with the cage and the plurality of circumferentially aligned wedge plate segments; and, urging the plurality of circumferentially aligned wedge plate segments radially outwardly into contact with the outer ring; and, an actuation plate non-rotatably connected to the shaft, wherein:

for a connect mode for the radial wedge clutch, the shaft, the plurality of circumferentially aligned wedge plate segments, and the outer ring are non-rotatably connected;

for a disconnect mode for the radial wedge clutch, the shaft is rotatable with respect to the outer ring; and, to transition from the connect mode to the disconnect mode:

the actuation plate is displaceable in a first axial direction to disengage from the cage;

the shaft rotates in a first circumferential direction;

the second ramps slide along the plurality of first ramps in the first circumferential direction; and, the at least one resilient element displaces the plurality of circumferentially aligned wedge plate segments radially outwardly and out of contact with the shaft.

\* \* \* \* \*